United States Patent
Albuz et al.

(10) Patent No.: US 8,411,751 B2
(45) Date of Patent: Apr. 2, 2013

(54) REDUCING AND CORRECTING MOTION ESTIMATION ARTIFACTS DURING VIDEO FRAME RATE CONVERSION

(75) Inventors: Elif Albuz, Sunnyvale, CA (US); Tarik Arici, Santa Clara, CA (US); Robert Jan Schutten, San Jose, CA (US); Santanu Dutta, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 593 days.

(21) Appl. No.: 12/637,774

(22) Filed: Dec. 15, 2009

(65) Prior Publication Data

US 2011/0141349 A1 Jun. 16, 2011

(51) Int. Cl.
*H04N 7/18* (2006.01)
(52) U.S. Cl. .............................. 375/240.16; 375/240.17
(58) Field of Classification Search . 375/240.01–240.29
See application file for complete search history.

(56) References Cited

U.S. PATENT DOCUMENTS

| | | | | |
|---|---|---|---|---|
| 5,533,138 | A * | 7/1996 | Kim et al. | 382/232 |
| 6,115,420 | A * | 9/2000 | Wang | 375/240.03 |
| 6,192,079 | B1 * | 2/2001 | Sharma et al. | 375/240.16 |
| 2009/0296818 | A1 * | 12/2009 | Piek et al. | 375/240.16 |

* cited by examiner

*Primary Examiner* — Andy Rao
(74) *Attorney, Agent, or Firm* — Raj Abhyanker, P.C.

(57) ABSTRACT

A method includes projecting motion vectors describing a transformation from a previous video frame to a future video frame onto a plane between the previous video frame and the future video frame, detecting potential artifacts at the plane based on an intersection of a cover region and an uncover region on the plane, and analyzing a dissimilarity between a trial video frame and both the previous video frame and the future video frame. The trial video frame is generated between the previous video frame and the future video frame based on a frame rate conversion ratio derived from a source frame rate and a desired frame rate. The method also includes estimating reliability of the projected motion vectors based on the potential artifact detection and the dissimilarity analysis.

17 Claims, 6 Drawing Sheets

PREVIOUS FRAME 102
(n)

INTERPOLATED FRAME 104

FUTURE FRAME 106
(n+1)

REDUCING AND CORRECTING MOTION ESTIMATION ARTIFACTS DURING VIDEO FRAME RATE CONVERSION

FIELD OF TECHNOLOGY

This disclosure relates generally to video frame rate conversion and, more particularly, to a method, an apparatus, and a system for correcting potential artifacts due to motion estimation prior to generating an interpolated video frame between adjacent video frames.

BACKGROUND

A video sequence may need to be displayed at a frame rate (frames per second or fps) that is different from the frame rate of the source video. For example, a 24 Hz progressive DVD video may need to be displayed on a 60 Hz LCD TV. The number of video frames may then be matched (e.g., by increasing the number of frames) to the frame rate (or refresh rate) using frame rate conversion algorithms implemented on a processor associated with decoding the video. The motion of objects in the video may, therefore, appear smooth and pleasant to the human eye.

Frame rate conversion algorithms are also used in format conversion, video compression, stereo vision, and video quality enhancement. During rendering of a video on a display at a frame rate higher than the source video frame rate, intermediate video frames may need to be inserted between adjacent video frames of the source video through interpolation. Frame rate conversion may be achieved by repeating the video frames and/or using linear interpolation between the adjacent video frames. However, these methods may introduce artifacts, and may cause motion blur and/or judder. Therefore, interpolation of the intermediate video frames may potentially degrade the viewing experience.

During motion-compensated frame rate conversion, motion estimation may be very complex, and estimated motion vectors may not be very representative of the interpolated video frame. This may cause artifacts when the aforementioned estimated motion vectors are used in interpolation of the new video frame between adjacent video frames. Adaptive artifact masking, black stripe processing and occlusion tracking are examples of methods that may be used to reduce the artifacts. Another approach may be to gradually shift the interpolated point towards the original frames as the motion quality worsens and then to shift back as the quality improves.

During motion estimation, three-dimensional (3D) motion may be modeled using two-dimensional (2D) information. Multiple motion vectors may project to the same pixel position on a projected plane between the adjacent video frames, thereby rendering the determination of the correct motion vector to model a region difficult. For example, when an object is scaling down in size from frame to frame, multiple motion vectors may be pointing towards the center of the object. Therefore, these multiple motion vectors may cause a conflict at the projected plane.

SUMMARY

Disclosed are a method, an apparatus, and a system for correcting potential artifacts due to motion estimation prior to generating an interpolated video frame between adjacent video frames.

In one aspect, a method includes projecting motion vectors describing a transformation from a previous video frame to a future video frame onto a plane between the previous video frame and the future video frame. The previous video frame is in a temporal past compared to the future video frame. The method also includes detecting potential artifacts at the plane based on an intersection of a cover region and an uncover region on the plane, and analyzing a dissimilarity between a trial video frame and both the previous video frame and the future video frame.

The cover region indicates that corresponding pixels on a region of the plane are solely located in the previous video frame, and the uncover region indicates that corresponding pixels on the region of the plane are solely located in the future video frame. The intersection of the cover region and the uncover region indicates a number of conflicting motion vectors at a region of intersection on the plane.

The trial video frame is generated between the previous video frame and the future video frame based on a frame rate conversion ratio derived from a source frame rate and a desired frame rate. Further, the method includes estimating reliability of the projected motion vectors based on the potential artifact detection and the dissimilarity analysis.

In another aspect, a method includes projecting motion vectors describing a transformation from a previous video frame to a future video frame onto a plane between the previous video frame and the future video frame. The previous video frame is in a temporal past compared to the future video frame. The method also includes statistically analyzing the projected motion vectors for a number of cover regions, a number of uncover regions, and a number of conflicting regions on the plane, and analyzing a dissimilarity between a trial video frame and both the previous video frame and the future video frame.

The cover region indicates that corresponding pixels on a region of the plane are solely located in the previous video frame, and the uncover region indicates that corresponding pixels on the region of the plane are solely located in the future video frame. The conflicting region simultaneously indicates a cover region and an uncover region. The trial video frame is generated between the previous video frame and the future video frame based on a frame rate conversion ratio derived from a source frame rate and a desired frame rate.

Further, the method includes correcting a location of the plane and a blending factor for a pixel on the plane based on the statistical analysis and the dissimilarity analysis, and generating, between the previous video frame and the future video frame, an interpolated video frame with the corrected blending factor at the corrected location of the plane.

In yet another aspect, a system includes a display unit configured to display a video at a first frame rate, and a multimedia processor. The multimedia processor is configured to project motion vectors describing a transformation from a previous video frame to a future video frame onto a plane between the previous video frame and the future video frame, and to detect potential artifacts at the plane based on an intersection of a cover region and an uncover region on the plane.

The previous video frame is in a temporal past compared to the future video frame. Both the previous video frame and the future video frame are frames of a source video configured to be rendered on the display unit. The cover region indicates that corresponding pixels on a region of the plane are solely located in the previous video frame, and the uncover region indicates that corresponding pixels on the region of the plane are solely located in the future video frame. The intersection of the cover region and the uncover region indicates a number of conflicting motion vectors at a region of intersection on the plane.

Further, the multimedia processor is configured to analyze a dissimilarity between a trial video frame and both the previous video frame and the future video frame, to correct a location of the plane and a blending factor for a pixel on the plane based on the potential artifact detection and the dissimilarity analysis, and to generate, between the previous video frame and the future video frame, an interpolated video frame with the corrected blending factor at the corrected location of the plane.

The trial video frame is generated between the previous video frame and the future video frame based on a frame rate conversion ratio derived from a frame rate of the source video and the first frame rate. The interpolated video frame is configured to be rendered along with the previous video frame and the future video frame on the display unit at the first frame rate.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system, and an apparatus for correcting potential artifacts due to motion estimation prior to generating an interpolated video frame between adjacent video frames. Although the present embodiments have been described with reference to specific example embodiments, it will be evident that various modifications and changes may be made to these embodiments without departing from the broader spirit and scope of the various embodiments.

Figure 1:
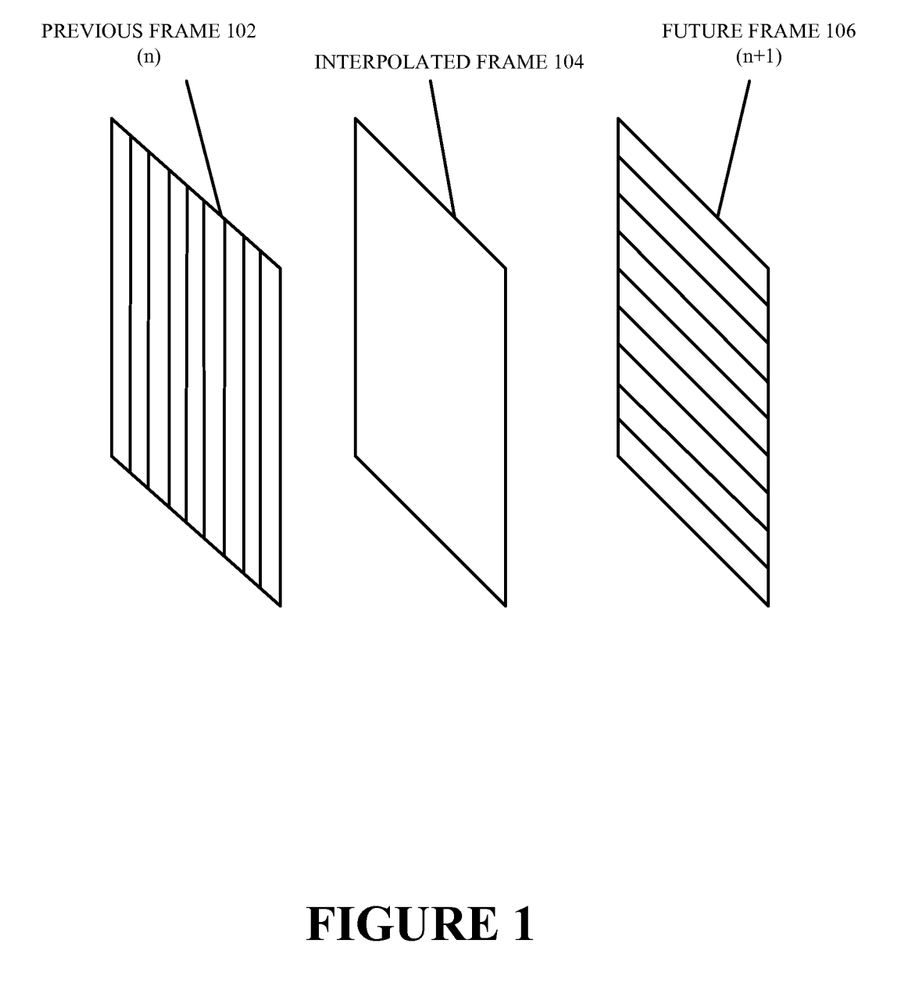
FIG. 1 is a schematic view of two video frames utilized to construct an interpolated frame, according to one or more embodiments.

FIG. 1 shows two video frames (102, 106) utilized to construct an interpolated frame 104, according to one or more embodiments. In one or more embodiments, the two video frames (102, 106) may include an $n^{th}$ frame 102 and an $(n+1)^{th}$ frame 106 of an original source video. In one or more embodiments, the $n^{th}$ frame 102 may be in a temporal "past" compared to the interpolated frame 104, and the $(n+1)^{th}$ frame 106 may be in a temporal "future" compared to the interpolated frame 104. Therefore, in one or more embodiments, the $n^{th}$ frame 102 may be referred to as the previous frame 102 and the $(n+1)^{th}$ frame may be referred to as a future frame 106 for convenience purposes. Here, n may be a positive number.

In one or more embodiments, the construction of the interpolated frame 104 may include motion estimation and motion compensation. In one or more embodiments, the motion estimation may include obtaining motion vectors from the previous frame 102 and the future frame 106. In one or more embodiments, the motion vectors obtained from the previous frame 102 may be denoted as $MV_p$ and the motion vectors obtained from the future frame 106 may be denoted as $MV_f$. In one or more embodiments, the motion vectors may be obtained using techniques not limited to block-matching, phase correlation, pixel recursion, optical flow, Mean Squared Error (MSE) evaluation, Sum of Absolute Differences (SAD) evaluation, Sum of Squared Errors (SSE) evaluation, and Sum of Absolute Transformed Differences (SATD) evaluation.

In one or more embodiments, as discussed above, motion estimation may involve projection of a three-dimensional (3D) scene onto a two-dimensional (2D) plane. Therefore, in one or more embodiments, $MV_p$ and $MV_f$ may be projected onto a plane located between the previous frame 102 and the future frame 106. In one or more embodiments, as multiple motion vectors may project to the same pixel position, determining the motion vector to correctly model the interpolated frame 104 may be difficult, as discussed above. Therefore, in one or more embodiments, the reliability of the motion vectors ($MV_p$ and $MV_f$) may need to be analyzed, estimated, and utilized to adapt an interpolation factor prior to computing the final interpolated frame 104.

In one or more embodiments, the reliability of the motion vectors may be analyzed from the geometry thereof. For example, in one or more embodiments, at the reconstruction time point, every 32×32 region of pixels on a projected (e.g., to be interpolated) frame may be checked for covering and uncovering occurring at the same time, which indicates a high likelihood of having the wrong motion vectors from the motion estimation process. In one or more embodiments, the covering and uncovering may indicate the type of occlusion occurring in the 32×32 region. In one or more embodiments, in the case of a local uncovering, corresponding pixels may only be found in the next frame (e.g., in the future frame 106). In one or more embodiments, in the case of a local covering, corresponding pixels may only be found in the previous frame (e.g., in the previous frame 102). Therefore, in one or more embodiments, a forward projection exclusively creating a "hole" may signal an uncover region, and a backward projection exclusively creating a "hold" may signal a cover region.

In one or more embodiments, the utilization of at least two frames (previous frame 102 and the future frame 106) may, therefore, be essential. In one or more embodiments, a chaos measure indicating covering, uncovering, and conflicting motion vectors (e.g., simultaneously indicating covering and uncovering) in a local region of the projected frame may be obtained from the motion estimation. In one example embodiment, the chaos measure may be obtained as in Equations (1) and (2):

$$CN = (C*\text{cl}((U+UK-4),0,16) >> 3) + (U*\text{cl}((C+UK-4),0,16) >> 3) + 8*UK - 8, \text{ and} \qquad (1)$$

$$\text{Local } CN\ 32 \times 32 = \text{cl}(CN, 0, 255) \qquad (2)$$

where CN is a chaos number, C is the covered pixel count in a local region, U is the uncovered pixel count in a local region, UK is the uncovered pixel count in the projected frame, >> is the bitwise right shift operator (e.g., 8>>3 shifts the binary representation of 8, e.g., 00001000 right by 3 bits. This would result in 00000001, or, the decimal number 1), cl is a clamp function implemented such that cl(a,min,max) would limit a between the min and max values, and Local CN 32×32 is the chaos number for a local 32×32 region. In one or more embodiments, the chaos number statistics may, therefore, determine the intersection of cover-uncover regions.

In one or more embodiments, the number of bits to right shift and the arguments chosen in the clamp function may be size dependent and are shown in Equations (1) and (2) for a 32×32 region as merely an example.

In one or more embodiments, the "quality" (e.g., reliability) of the motion vectors may again be analyzed through the generation of a trial interpolated frame using the motion vectors. In one or more embodiments, the trial interpolated frame may be generated through a blind interpolation using $MV_p$ and $MV_f$. In one or more embodiments, utilizing the fraction factor derived from the frame rate conversion ratio dependent on a frame rate of the original source video and the desired frame rate (e.g., frame rate in a Liquid Crystal Display (LCD) configured to render the original source video), the motion vectors may be projected onto the trial interpolated frame, after being interpolated with a weight factor determining the blending factor from the previous frame 102 and the future frame 106.

In one or more embodiments, for example, two 6×6 SAD values centered on a 2×2 region of the trial interpolated frame may be computed for every 2×2 region thereof. In one or more embodiments, the two SAD values may include $SAD_p$ and $SAD_n$, where $SAD_p$ denotes the SAD between the trial interpolated frame and the previous frame 102 and $SAD_n$, denotes the SAD between the trial interpolated frame and the future frame 106. In one or more embodiments, a single SAD value may then be generated for a 2×2 region as shown in example Equation (3).

$$SAD\ 2\times 2 = cl(((((128-wt)*SAD_p + wt*SAD_n)>>9)-144),0,128) \qquad (3)$$

In example Equation (3), SAD 2×2 is the SAD value generated for the 2×2 region and wt denotes the blending factor for reference pixels of the previous frame 102 and the future frame 106 used in generating the trial interpolated frame. In one or more embodiments, the choice of the number of bits to right shift and the arguments in the clamp function may, again, be dictated by the region size.

In one or more embodiments, the SAD 2×2 values may then be summed up over the 32×32 regions as shown in example Equation (4) as:

$$SAD\ 32\times 32 = cl(((\Sigma_{\forall k \in 32\times 32} SAD\ 2\times 2(k))>>7),0,255) \qquad (4)$$

In example Equation (4), SAD 32×32 may be the SAD value obtained for the 32×32 region after summing up the SAD values for the 2×2 regions. Again, the arguments in the clamp function may be dictated by the chosen region size.

In one or more embodiments, it is to be noted that the local chaos measure of Equation (2) and the SAD measure of Equation (4) are generated for a same region size (e.g., 32×32 pixel region). In one or more embodiments, these two measures may cover geometrical and pixel association aspects of constructed regions in the trial interpolated frame. In one or more embodiments, the trial interpolated frame may not be displayed, and may merely be used to detect potential artifacts.

In one or more embodiments, to err on the side of caution, the maximum of Local CN 32×32 and SAD 32×32 may then be utilized to arrive at a figure of demerit (FD) for each 32×32 pixel block. In one or more embodiments, this FD may be the "local" fallback factor, which indicates as to whether a corresponding region/block may need to be concealed. In one or more embodiments, the utilization of the "local" fallback factor directly may cause visible artifacts at the boundaries of the concealment regions. In one or more embodiments, concealing a region larger than the focal area of a viewer (e.g., a human) may lead to fewer visual disturbances. Therefore, in one or more embodiments, in order to avoid sharp edge transitions on the 32×32 pixel region boundaries, a 3×3 low pass filter, for example, may be applied to the 32×32 pixel regions to smoothen the FD numbers and spread the "local" fallback factor further.

In one or more embodiments, a 7×7 average filter (e.g., low pass filter), for example, may then be applied in 7×7 neighborhoods of the 32×32 pixel region to spread out the "local" fallback factor even further to a larger area. In one or more embodiments, a "global" fallback factor may be derived over the entire projected (e.g., to be interpolated) frame by summing the "local" fallback factors for all 32×32 pixel regions as shown in example Equation (5).

$$gf = cl\left(\left(\left(\frac{\Sigma_{\forall 32\times 32 regions} \max(SAD\ 32\times 32,\ Local\ CN 32\times 32)}{M}\right) - 8\right)*16,\ 0,\ 255\right) \qquad (5)$$

In example Equation (5), gf is the "global" fallback factor, max is a function that returns the maximum of two arguments (e.g., SAD 32×32 and Local CN 32×32), and M is the total number of 32×32 regions. Yet again, the arguments in the clamp function may be size dependent.

Figure 2:
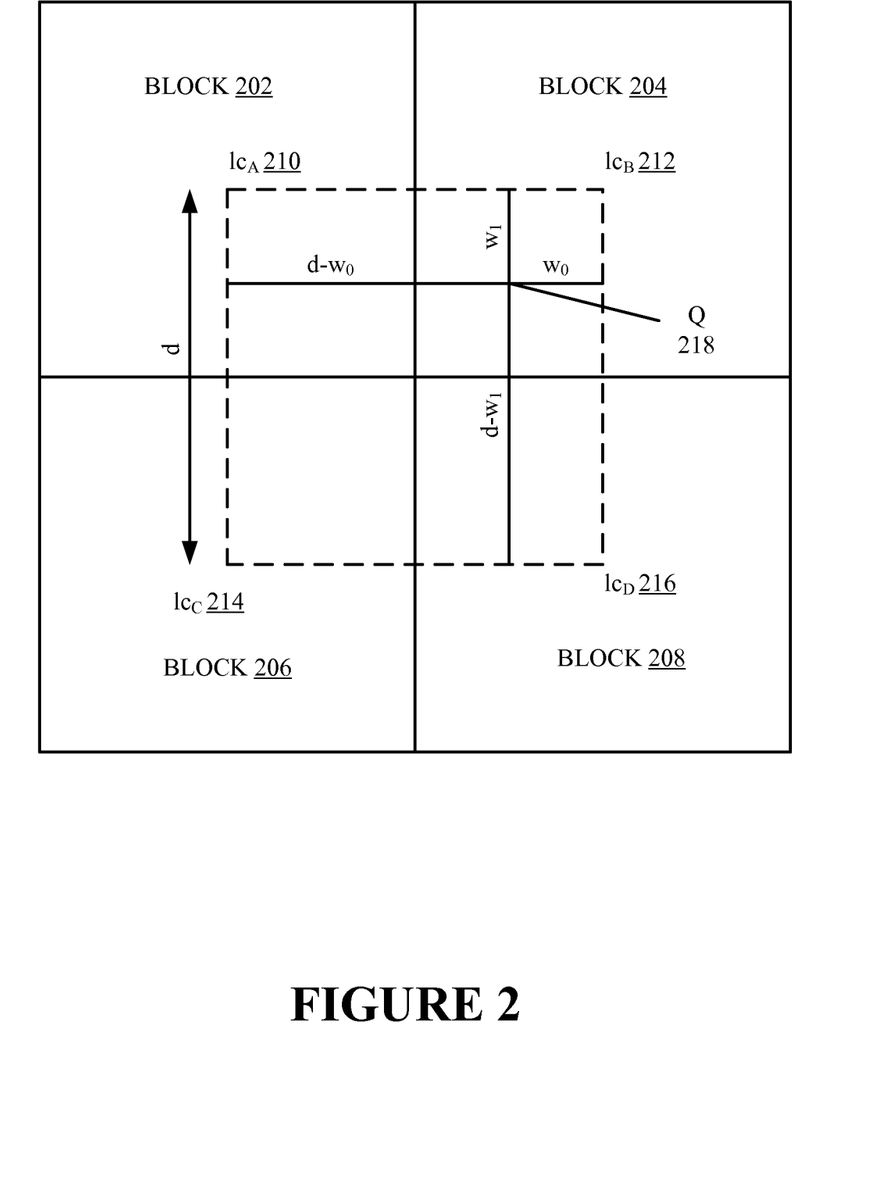
FIG. 2 is a schematic view of an interpolation of "local" fallback factors at a 2×2 pixel region level, according to one or more embodiments.

In one or more embodiments, in order to obtain reliable numbers at the 2×2 pixel region level (e.g., improved granularity), an upsampling operation (e.g., 2D filtering) may be performed on the FD values to obtain local interpolation weights for each 2×2 pixel region. FIG. 2 shows the interpolation of "local" fallback factors at the 2×2 pixel region level, according to one or more embodiments. In one or more embodiments, in FIG. 2, each 2×2 block (202, 204, 206, and 208) may be marked with respective "local" fallback factors obtained as described above (e.g., $lc_A$ 210, $lc_B$ 212, $lc_C$ 214, and $lc_D$ 216). In one or more embodiments, after the "local" fallback factors (e.g., $lc_A$ 210, $lc_B$ 212, $lc_C$ 214, and $lc_D$ 216) have been enlarged and smoothed out, as described above, the "local" fallback factors may be interpolated for every pixel position using the closest regions (e.g., three regions, as in FIG. 2) as shown in example Equations (6) and (7).

$$f = \frac{w_0 * (w_1 * lc_C + (d - w_1) * lc_A) + (d - w_0) * (w_1 * lc_D + (d - w_1) * lc_B)}{d^2}, \qquad (6)$$

and $$f2\times 2 = (f + 128) >> 8 \qquad (7)$$

In one or more embodiments, a particular point Q 218 inside a block (e.g., block 204 in FIG. 2) may be interpolated using the horizontal distance to the center thereof ($w_0$) and the vertical distance to the center ($w_1$). In example Equation (6), f is the interpolated "local" fallback factor, and d is the length of the side of a square formed by joining the centers of the individual blocks. In example Equation (7), f 2×2 is the "local" fallback factor for a 2×2 pixel region. The number of bits to right shift, again, is size dependent.

In one or more embodiments, f 2×2, in combination with gf, may then be used to bring the trial region closer to one of the reference frames (e.g., previous frame 102 and future frame 106). In one or more embodiments, when multiple motion vector candidates are selected to represent a pixel at a particular position, the blending factor discussed above may be affected. In one or more embodiments, the motion vectors may be projected to an intermediate position modulated by f 2×2.

In one or more embodiments, the intended fractional point of the projected (e.g., to be interpolated) frame, frac, may be modified as shown in example Equation (8).

$$mfrac = frac * \left(1 - \frac{f2 \times 2}{256}\right) * \left(1 - \frac{gf}{256}\right) \quad (8)$$

In example Equation (8), mfrac is the modified fraction that denotes the new position of the projected (e.g., to be interpolated) frame between the previous frame 102 and the future frame 106. In one or more embodiments, mfrac may lie between 0 and 1, with 0 being the position of the previous frame 102 and 1 being the position of the future frame 106. In one or more embodiments, modifying position alone during projection may necessitate modification of the blending factor. In one or more embodiments, the weight associated with the frame (e.g., previous frame 102 and future frame 106) closer to the projected (e.g., to be interpolated) frame may also be modulated, e.g., multiplied with $$\left(1 - \frac{f2 \times 2}{256}\right) * \left(1 - \frac{gf}{256}\right).$$

In one or more embodiments, g f may apply to all pixels of the projected frame and f 2×2 may apply to, for example, all 2×2 pixel regions.

Thus, in one or more embodiments, the location of the plane onto which the motion vectors ($MV_p$ and $MV_f$) were initially projected may be corrected based on mfrac. As discussed above, the blending factors for pixels on the plane may also be corrected.

In one or more embodiments, assuming a reference point on the previous frame 102 to be P(x,y) and a reference point on the future frame 106 to be F(x,y), frames interpolated using P(x,y) and F(x,y) may respectively be expressed as example Equations (9) and (10).

$$F_p = P((x + mfrac(x,y) \cdot MV_{px}), (y + mfrac(x,y) \cdot MV_{py})), \quad (9)$$

$$F_f = F((x + mfrac(x,y) \cdot MV_{fx}), (y + mfrac(x,y) \cdot MV_{fy})) \quad (10)$$

In example Equations (9) and (10), $F_p$ and $F_f$ are frames interpolated using the previous frame 102 and the future frame 106 respectively, $MV_{px}$ and $MV_{fx}$ are x-coordinate values of $MV_p$ and $MV_f$ respectively, and $MV_{py}$ and $MV_{fy}$ are y-coordinate values of $MV_p$ and $MV_f$ respectively. mfrac is shown as a function of x and y because f 2×2 and gf in example Equation (8) may be functions of x and y. In one or more embodiments, the interpolated frame 104 may then be obtained as a weighted average of $F_p$ and $F_f$. In one or more embodiments, there may be a number of interpolated frames 104 generated between the previous frame 102 and the future frame 106 based on the frame rate conversion needs. In one or more embodiments, the generation of other frames between the previous frame 102 and the future frame 106 is similar to the generation of the interpolated frame 104 discussed above.

In one or more embodiments, as the abovementioned generation of the interpolated frame 104 involves utilizing at least two frames (e.g., the previous frame 102 and the future frame 106), there may be a number of previous frames 102 and future frames 106 utilized in the generation of an interpolated frame 104. Again, this process is similar to the generation of the interpolated frame 104 discussed above. In one or more embodiments, the generation of interpolated frames 104 may allow for a smooth video viewing process, with reduced motion estimation induced artifacts. In one or more embodiments, this may also provide for reduced motion judder on a display unit (e.g., an LCD).

Figure 3:
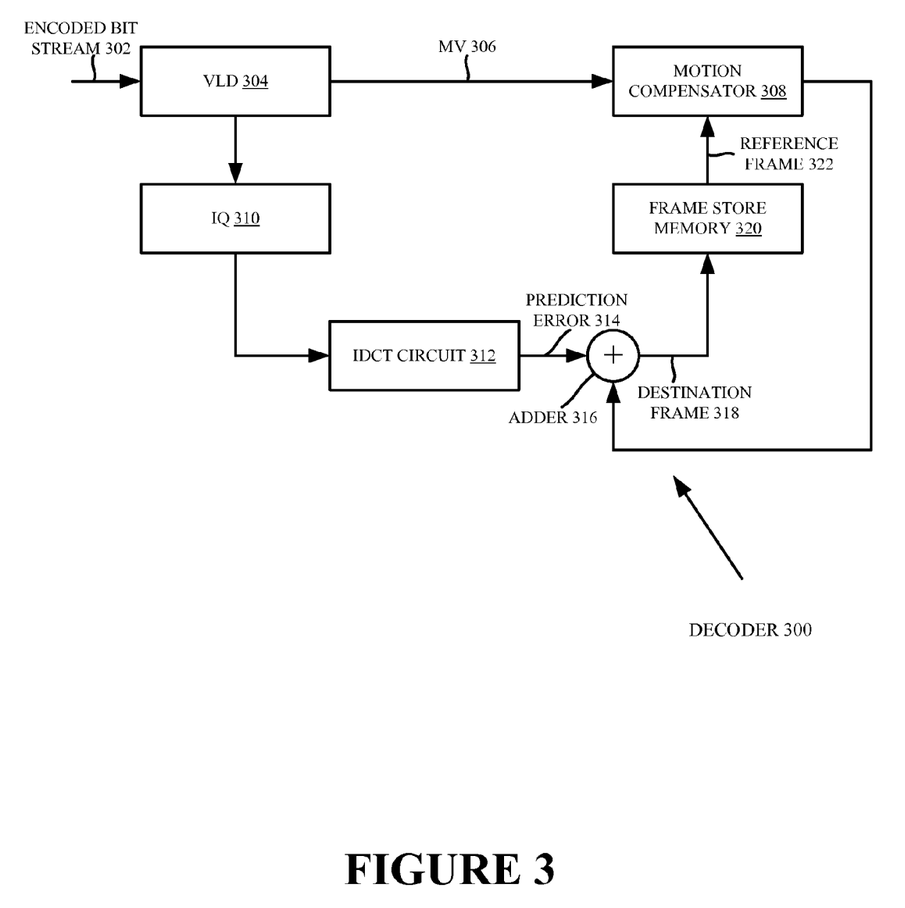
FIG. 3 is a schematic view of a decoder, according to one or more embodiments.

FIG. 3 shows a block diagram of a decoder 300 (e.g., MPEG-2 decoder), according to one or more embodiments. In one or more embodiments, a variable length decoder (VLD) 304 may receive an encoded data stream 302 representing, for example, Huffman/Run-Level coded quantized Discrete Cosine Transform (DCT) coefficients as an input. In one or more embodiments, the quantized DCT coefficients, in turn, may represent macroblocks of a video frame. Therefore, in one or more embodiments, the encoded data stream 302 input to the VLD 304 may also include motion vector (MV) 306 data (e.g., $MV_p$ and $MV_f$) and information indicating the type of frames (e.g., intra-coded (I-) frames, predictive (P-) frames or bi-predictive (B-) frames). In one or more embodiments, as at least two reference frames (e.g., previous frame 102 and future frame 106) may be required to generate the interpolated frame 104, the interpolated frame 104 may be a B-frame.

In one or more embodiments, the quantized DCT coefficients may be fed to the Inverse Quantizer (IQ) 310 that performs an inverse quantization on the coefficients. Following the inverse quantization, in one or more embodiments, the scaled coefficients may be passed through an Inverse Discrete Cosine Transform (IDCT) circuit 312 that transforms a block of coefficients to a prediction error 314 block of pixels. In one or more embodiments, a series of blocks may allow for an entire prediction error 314 macroblock to be decoded.

In one or more embodiments, the MV 306 data may be parsed from the data stream and sent to the motion compensator 308. In one or more embodiments, the MV 306 data may be used to read a predicted macroblock out of stored reference frames 322 (e.g., previous frame 102, future frame 106) in the frame store memory 320. In one or more embodiments, the motion compensator 308 output, e.g., the predicted macroblock, may be added to the prediction error 314 macroblock to generate a reconstructed macroblock of a destination frame 318 (e.g., interpolated frame 104). In one or more embodiments, the output of the adder 316 may be stored as reference macroblocks, and, hence, reference frames 322, in the frame store memory 320 for future predictions.

In one or more embodiments, the interpolated frame 104 may then be displayed on a display unit (e.g., LCD). In one or more embodiments, the trial interpolated frame described above may, for example, be merely stored in the frame store memory 320. In one or more embodiments, the processes described above may be performed using a multimedia processor (e.g., a Graphics Processing Unit (GPU)) associated with the decoding. In one or more embodiments, the multimedia processor may be associated with a set-top box configured to convert an external signal (e.g., video) into content to be rendered on a display (e.g., television screen).

Figure 4:
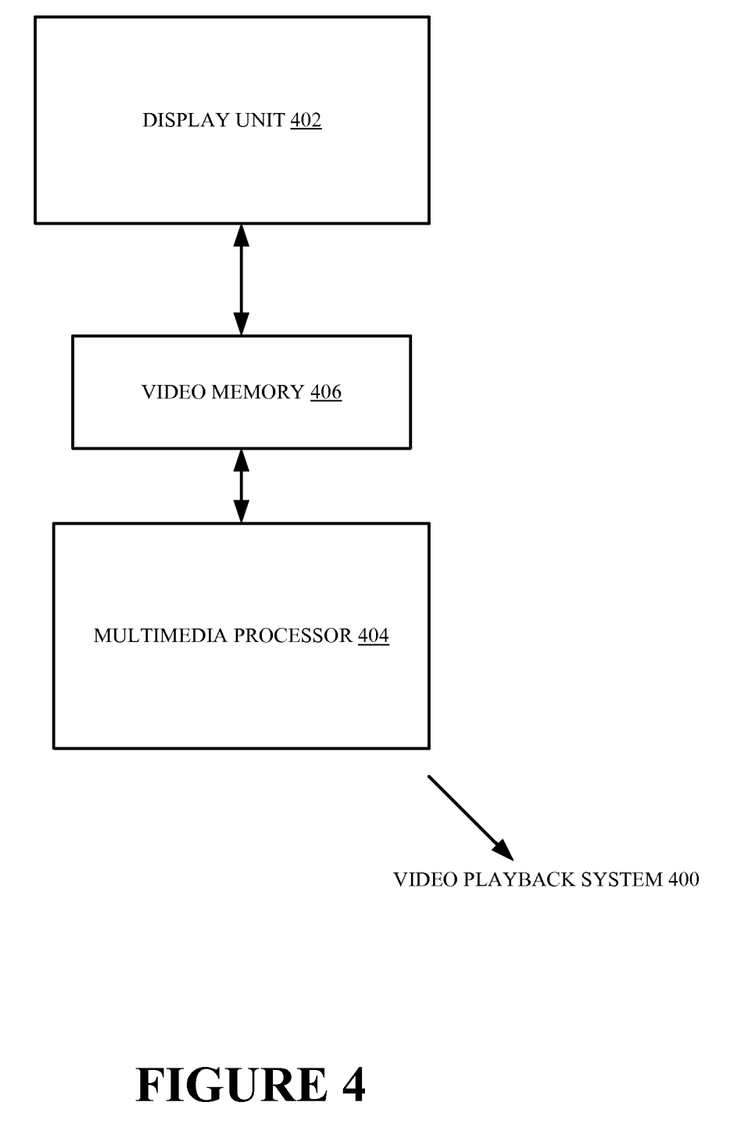
FIG. 4 is a schematic view of a video playback system, according to one or more embodiments.

FIG. 4 shows a video playback system 400, according to one or more embodiments. In one or embodiments, the video playback system 400 includes a display unit 402 (e.g., an LCD) and a multimedia processor 404 (e.g., a GPU) configured (e.g., programmed) to perform the processes involved in generating the interpolated frame 104 described above. In one or more embodiments, the multimedia processor 404 may be interfaced with the display unit 402 through a video memory 406 (e.g., video Random Access Memory (RAM)) configured to serve as a buffer (e.g., frame buffer) between the multimedia processor 404 and the display unit 402.

Figure 5:
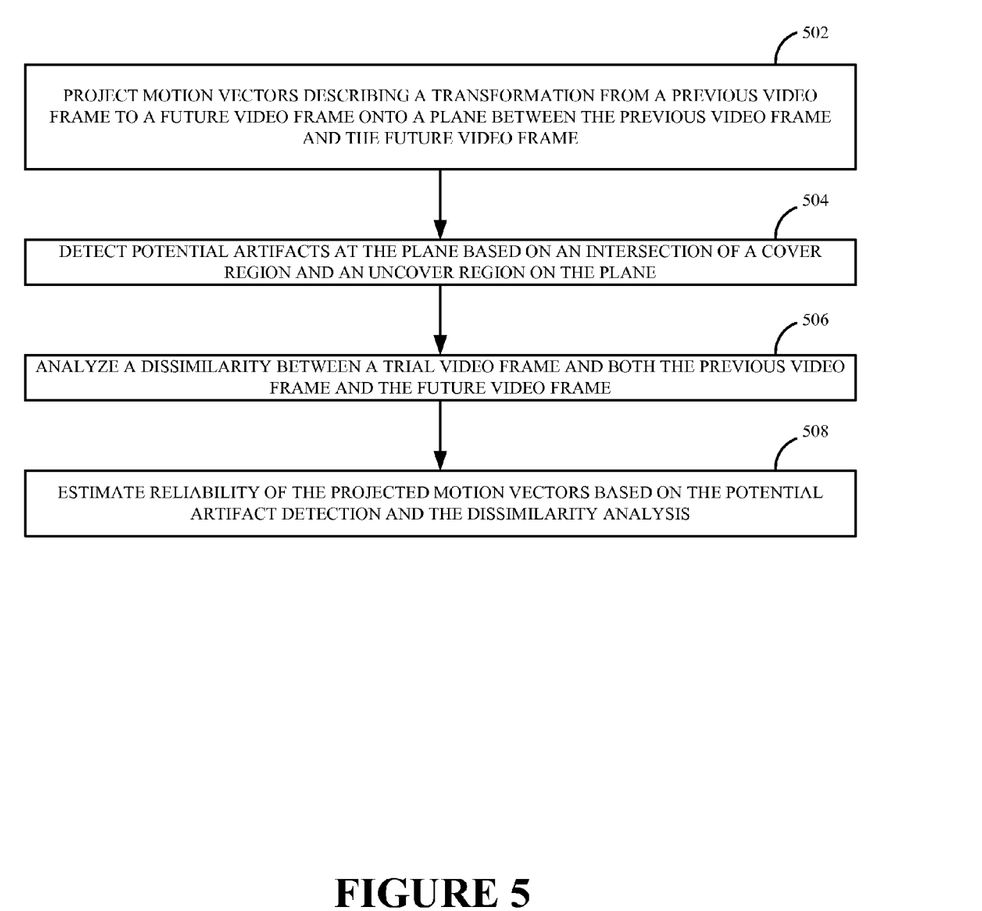
FIG. 5 is a process flow diagram detailing the operations involved in estimating reliability of motion vectors during a frame rate conversion, according to one or more embodiments.

FIG. 5 shows a process flow diagram detailing the operations involved in estimating reliability of motion vectors during a frame rate conversion, according to one or more embodiments. In one or more embodiments, operation 502 may involve projecting motion vectors describing a transformation from a previous frame 102 to a future frame 106 onto a plane between the previous frame 102 and the future frame 106. In one or more embodiments, the previous frame 102 may be in a temporal past compared to the future frame 106.

In one or more embodiments, operation 504 may involve detecting potential artifacts at the plane based on an intersection of a cover region and an uncover region on the plane. In one or more embodiments, the cover region may indicate that corresponding pixels on a region of the plane are solely located in the previous frame 102, and the uncover region may indicate that corresponding pixels on the region of the plane are solely located in the future frame 106. In one or more embodiments, the intersection of the cover region and the uncover region may indicate a number of conflicting motion vectors at a region of intersection on the plane.

In one or more embodiments, operation 506 may involve analyzing a dissimilarity between a trial video frame and both the previous frame 102 and the future frame 106. In one or more embodiments, the trial video frame may be generated between the previous frame 102 and the future frame 106 based on a frame rate conversion ratio derived from a source frame rate and a desired frame rate. In one or more embodiments, operation 508 may then involve estimating reliability of the projected motion vectors based on the potential artifact detection and the dissimilarity analysis.

Figure 6:
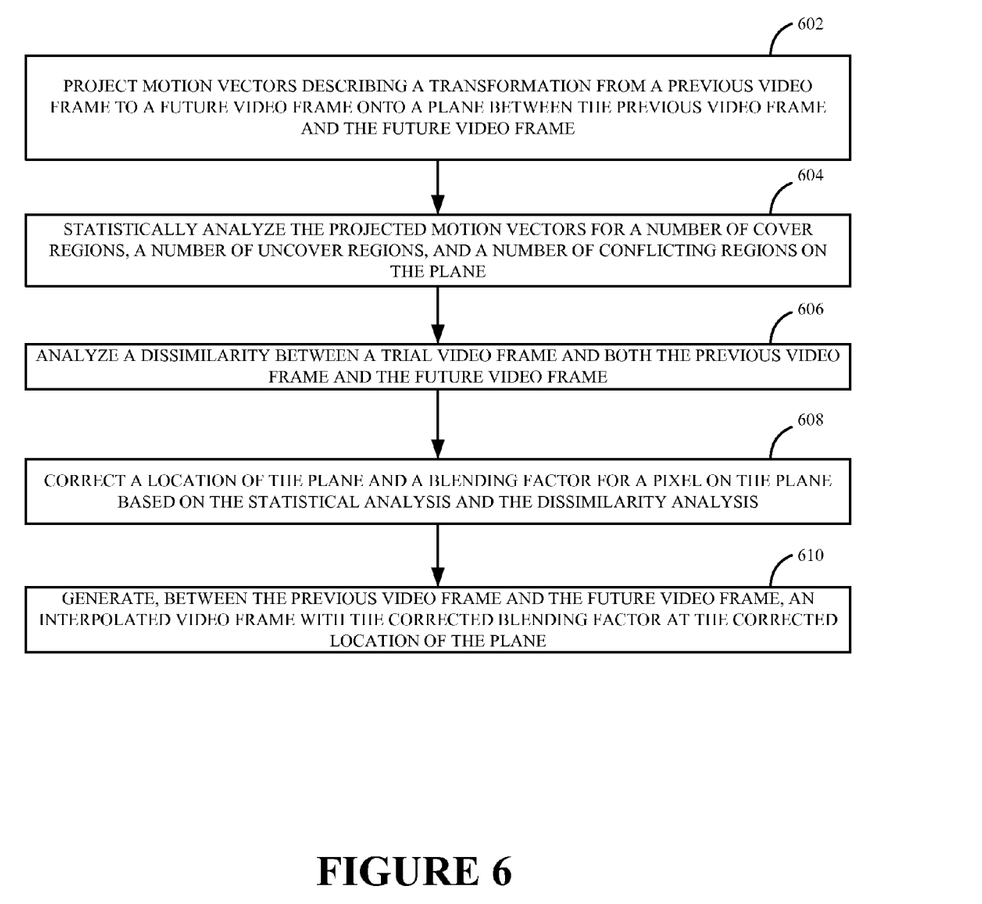
FIG. 6 is a process flow diagram detailing the operations involved in generating an interpolated frame, according to one or more embodiments.

FIG. 6 shows a process flow diagram detailing the operations involved in generating an interpolated frame 104, according to one or more embodiments. In one or more embodiments, operation 602 may involve projecting motion vectors describing a transformation from a previous frame 102 to a future frame 106 onto a plane between the previous frame 102 and the future frame 106. In one or more embodiments, the previous frame 102 may be in a temporal past compared to the future frame 106.

In one or more embodiments, operation 604 may involve statistically analyzing the projected motion vectors for a number of cover regions, a number of uncover regions, and a number of conflicting regions on the plane. In one or more embodiments, the cover region may indicate that corresponding pixels on a region of the plane are solely located in the previous frame 102, and the uncover region may indicate that corresponding pixels on the region of the plane are solely located in the future frame 106. In one or more embodiments, the conflicting region may simultaneously indicate a cover region and an uncover region.

In one or more embodiments, operation 606 may involve analyzing a dissimilarity between a trial video frame and both the previous frame 102 and the future frame 106. In one or more embodiments, the trial video frame may be generated between the previous frame 102 and the future frame 106 based on a frame rate conversion ratio derived from a source frame rate and a desired frame rate.

In one or more embodiments, operation 608 may involve correcting a location of the plane and a blending factor for a pixel on the plane based on the statistical analysis and the dissimilarity analysis. In one or more embodiments, operation 610 may then involve generating, between the previous frame 102 and the future frame 106, an interpolated frame 104 with the corrected blending factor at the corrected location of the plane.

Although the present embodiments have been described with reference to specific example embodiments, it will be evident that various modifications and changes may be made to these embodiments without departing from the broader spirit and scope of the various embodiments. For example, the number of previous frames 102, the number of future frames 106, the number of interpolated frames 104, the dimensions of the averaging filters, and the size of pixel regions discussed above may be varied. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Accordingly, the specification and drawings are to be regarded in an illustrative rather than a restrictive sense.

What is claimed is:
1. A method comprising:
projecting motion vectors describing a transformation from a previous video frame to a future video frame onto a plane between the previous video frame and the future video frame, the previous video frame being in a temporal past compared to the future video frame;
detecting potential artifacts at the plane based on an intersection of a cover region and an uncover region on the plane, the cover region indicating that corresponding pixels on a region of the plane are solely located in the previous video frame, the uncover region indicating that corresponding pixels on the region of the plane are solely located in the future video frame, and the intersection of the cover region and the uncover region indicating a plurality of conflicting motion vectors at a region of intersection on the plane;
analyzing a dissimilarity between a trial video frame and both the previous video frame and the future video frame, the trial video frame being generated between the previous video frame and the future video frame based on a frame rate conversion ratio derived from a source frame rate and a desired frame rate; and
estimating reliability of the projected motion vectors based on the potential artifact detection and the dissimilarity analysis through obtaining a figure of demerit for each N×N block of pixels at the plane based on a higher of a result of the potential artifact detection and a result of the dissimilarity analysis to enable concealment of the corresponding N×N block of pixels, N being a positive even number.

2. The method of claim 1, wherein detecting potential artifacts at the plane based on the intersection of the cover region and the uncover region on the plane comprises statistically analyzing the projected motion vectors for a number of cover regions, a number of uncover regions, and a number of conflicting regions on the plane.

3. The method of claim 1, further comprising:
correcting, based on the estimated reliability of the projected motion vectors, a location of the plane and a blending factor for a pixel on the plane; and
generating, between the previous video frame and the future video frame, an interpolated video frame with the corrected blending factor at the corrected location of the plane.

4. The method of claim 1, wherein analyzing the dissimilarity between the trial video frame and both the previous video frame and the future video frame includes analyzing a Sum of Absolute Differences (SAD) between the trial video frame and both the previous video frame and the future video frame.

5. The method of claim 4, wherein an SAD between the trial video frame and the previous video frame and an SAD between the trial video frame and the future video frame are each weighted with respective blending factors for reference pixels on the previous video frame and the future video frame to generate the SAD between the trial video frame and both the previous video frame and the future video frame.

6. The method of claim 1,
wherein the figure of demerit is smoothed using an M×M filter to enable avoiding of a sharp edge transition at a boundary of an N×N block of pixels, and
wherein M≧1.

7. The method of claim 6, wherein the figure of demerit of an N×N block of pixels and the figure of demerit of a neighboring N×N block of pixels are interpolated based on a mutual distance thereof.

8. A method comprising:
projecting motion vectors describing a transformation from a previous video frame to a future video frame onto a plane between the previous video frame and the future video frame, the previous video frame being in a temporal past compared to the future video frame;
statistically analyzing the projected motion vectors for a number of cover regions, a number of uncover regions, and a number of conflicting regions on the plane, the cover region indicating that corresponding pixels on a region of the plane are solely located in the previous video frame, the uncover region indicating that corresponding pixels on the region of the plane are solely located in the future video frame, and the conflicting region simultaneously indicating a cover region and an uncover region;
analyzing a dissimilarity between a trial video frame and both the previous video frame and the future video frame, the trial video frame being generated between the previous video frame and the future video frame based on a frame rate conversion ratio derived from a source frame rate and a desired frame rate;
correcting a location of the plane and a blending factor for a pixel on the plane based on the statistical analysis and the dissimilarity analysis through obtaining a figure of demerit for each N×N block of pixels at the plane based on a higher of a result of the potential artifact detection and a result of the dissimilarity analysis to enable concealment of the corresponding N×N block of pixels, N being a positive even number; and
generating, between the previous video frame and the future video frame, an interpolated video frame with the corrected blending factor at the corrected location of the plane.

9. The method of claim 8, wherein analyzing the dissimilarity between the trial video frame and both the previous video frame and the future video frame includes analyzing an SAD between the trial video frame and both the previous video frame and the future video frame.

10. The method of claim 9, wherein an SAD between the trial video frame and the previous video frame and an SAD between the trial video frame and the future video frame are each weighted with respective blending factors for reference pixels on the previous video frame and the future video frame to generate the SAD between the trial video frame and both the previous video frame and the future video frame.

11. The method of claim 8,
wherein the figure of demerit is smoothed using an M×M filter to enable avoiding of a sharp edge transition at a boundary of an N×N block of pixels, and
wherein M≧1.

12. The method of claim 11, wherein the figure of demerit of an N×N block of pixels and the figure of demerit of a neighboring N×N block of pixels are interpolated based on a mutual distance thereof.

13. A system comprising:
a display unit configured to display a video at a first frame rate; and
a multimedia processor configured to:
project motion vectors describing a transformation from a previous video frame to a future video frame onto a plane between the previous video frame and the future video frame, the previous video frame being in a temporal past compared to the future video frame, and both the previous video frame and the future video frame being frames of a source video configured to be rendered on the display unit,
detect potential artifacts at the plane based on an intersection of a cover region and an uncover region on the plane, the cover region indicating that corresponding pixels on a region of the plane are solely located in the previous video frame, the uncover region indicating that corresponding pixels on the region of the plane are solely located in the future video frame, and the intersection of the cover region and the uncover region indicating a plurality of conflicting motion vectors at a region of intersection on the plane,
analyze a dissimilarity between a trial video frame and both the previous video frame and the future video frame, the trial video frame being generated between the previous video frame and the future video frame based on a frame rate conversion ratio derived from a frame rate of the source video and the first frame rate,
correct a location of the plane and a blending factor for a pixel on the plane based on the potential artifact detection and the dissimilarity analysis through obtaining a figure of demerit for each N×N block of pixels at the plane, the figure of merit being based on a higher of a result of the potential artifact detection and a result of the dissimilarity analysis to enable concealment of the corresponding N×N block of pixels, and N being a positive even number, and
generate, between the previous video frame and the future video frame, an interpolated video frame with the corrected blending factor at the corrected location of the plane to be rendered along with the previous video frame and the future video frame on the display unit at the first frame rate.

14. The system of claim 13, wherein the multimedia processor is configured to analyze the dissimilarity between the trial video frame and both the previous video frame and the future video frame based on a Sum of Absolute Differences (SAD) between the trial video frame and both the previous video frame and the future video frame.

15. The system of claim 13,
wherein the multimedia processor is further configured to smooth the figure of demerit using an M×M filter to enable avoiding of a sharp edge transition at a boundary of an N×N block of pixels, and
wherein M≧1.

16. The system of claim 15, wherein the multimedia processor is further configured to interpolate the figure of demerit of an N×N block of pixels and the figure of demerit of a neighboring N×N block of pixels based on a mutual distance thereof.

17. The system of claim 16,
wherein the multimedia processor is a Graphics Processing Unit (GPU), and
wherein the display unit is a Liquid Crystal Display (LCD).

* * * * *